United States Patent [19]

Wilkesmann

[11] 4,317,728

[45] Mar. 2, 1982

[54] WOBBLE CENTRIFUGE

[75] Inventor: Helmut Wilkesmann, Munich, Fed. Rep. of Germany

[73] Assignee: Krauss-Maffei Aktiengesellschaft, Munich, Fed. Rep. of Germany

[21] Appl. No.: 132,771

[22] Filed: Mar. 24, 1980

[30] Foreign Application Priority Data

Mar. 29, 1979 [DE] Fed. Rep. of Germany ....... 2912368

[51] Int. Cl.[3] .............................................. B01D 33/02

[52] U.S. Cl. .................................. 210/370; 210/380.1

[58] Field of Search ................... 210/356, 360 R, 365, 210/367, 369, 370, 380 R, 385, 489, 497.1, 499

[56] References Cited

U.S. PATENT DOCUMENTS

| | | | |
|---|---|---|---|
| 1,343,292 | 6/1920 | Turner | 210/497 R |
| 2,782,930 | 2/1957 | Heckmann | 210/370 |
| 2,796,990 | 6/1957 | Peck | 210/370 |
| 2,907,465 | 10/1959 | Heckmann et al. | 210/370 X |
| 3,233,735 | 2/1966 | Hultsch et al. | 210/367 |
| 3,630,379 | 12/1971 | Sharples | 210/369 |
| 4,153,551 | 5/1979 | Hultsch et al. | 210/367 X |
| 4,184,964 | 1/1980 | Hultsch et al. | 210/367 X |

FOREIGN PATENT DOCUMENTS

| | | | |
|---|---|---|---|
| 1794185 | 8/1959 | Fed. Rep. of Germany . | |
| 2730822 | 1/1979 | Fed. Rep. of Germany . | |
| 1182057 | 6/1959 | France | 210/369 |
| 189460 | 5/1937 | Switzerland . | |
| 826158 | 12/1959 | United Kingdom . | |

*Primary Examiner*—Robert H. Spitzer

*Attorney, Agent, or Firm*—Karl F. Ross

[57] ABSTRACT

A wobble centrifuge of the type in which a centrifuge drum is rotated about an axis and, in addition, has its axis gyrated about another axis for the controlled discharge of the solids from the large-diameter end of the frustoconical drum structure. The latter comprises a support arrangement of bars and rings which retain the rods forming the drum wall and defining between them openings through which the liquid is centrifugally forced. According to the invention, means is provided for imparting a periodic relative longitudinal displacement to these latter rods thereby dislodging solids which may become wedged into the gaps between the rods.

5 Claims, 5 Drawing Figures

WOBBLE CENTRIFUGE

CROSS REFERENCE TO RELATED APPLICATION

This application is related to my copending application Ser. No. 112,459 filed Jan. 16, 1980 which, together with the literature of record in the file thereof, discloses the principles of wobble-centrifuge operation.

FIELD OF THE INVENTION

The present invention relates to a wobble centrifuge and, more particularly, to a centrifuge especially adapted for the dewatering of solids and having a frustoconical drum from which the solids are induced to pass over the large-diameter end at least in part by a precession effect caused by the gyration of the drum axis about another axis forming an angle therewith while the drum is rotated about its axis.

BACKGROUND OF THE INVENTION

While the principles of wobble centrifuge operation will be apparent from the aforedescribed copending application, the literature in the file thereof and from the commonly assigned prior U.S. Pat. No. 4,153,551 issued May 8, 1979 (and the publications there cited), a brief review of these principles may assist in a similar understanding of the present invention.

In a wobble centrifuge, especially for the continuous operation of a liquid from a solid in a suspension or slurry introduced into the centrifuge drum, the latter is an open-work structure which frustoconically widens toward the solids-discharge end of the drum. The mixture of liquid and solids is introduced into the interior of the drum, e.g. via a distributor, so that the solids tend to lie along the perforate inner wall of the drum while the liquid phase is forced through the openings and thereby separated by the action of centrifugal force, from the solid phase.

Since such drums are generally rotated with extremely high G forces and angular velocities, the friction between the solid phase and the inner surface of the drum may be sufficient to prevent the solids from being continuously discharged.

In a wobble centrifuge, the drum is rotated about its axis of symmetry, being a body of revolution centered therealong, with the drum surface having generatrices inclined to this axis. The drum axis, in turn, is caused to orbit a vertical axis, for example, in a gyrating or wobbling movement which imparts a slinging type of movement to the solids and thereby promotes their migration toward the discharge edge of the drum and from this edge into a collecting chamber, trough, or space. The gyrating or wobble movement is carefully controlled or established so that a continuous discharge of the solids is ensured.

The drum of such centrifuge may be made up of a grate-like arrangement of rods which extend along the generatrices of the drum and define between them slot-like gaps forming the openings in the drum through which the liquid phase is discharged.

It is known, with such grate-like drums, to provide a support structure for the rods, generally located along the structure of the drum, which can include spaced-apart rings surrounding the array of rods and bars which connect these rings and which lie in axial planes of the drum, i.e. along generatrices thereof, usually in angularly equispaced relationship. The support structure may be connected to upper and lower (end) flanges at one of which the drum is mounted for rotation about its axis on a shaft which, in turn, can be coaxial with another shaft defining the vertical or fixed axis about which the drum axis is orbited. The shaft stub which rotatably entrains the drum flange may be connected to a drive shaft by a universal joint so that the two coaxial members can be rotated at different angular velocities to establish the gyrating or precession movement.

With such wobble centrifuges, problems have been encountered which interfere with continuous operation. For example, when the solid phase includes hard, sharp-edged or elastic, ball-shaped particles, frequently these particles tend to become wedged in the gaps or slots formed between the rods so that the gaps become blocked and the efficiency of liquid separation is reduced.

Until now it has been assumed that the most effective way to overcome this disadvantage has been to properly shape the gap. For example, the cross section of the gap can increase outwardly to limit the wedge action. Notwithstanding such design techniques, however, the problem has not been completely alleviated and it has been found that this approach only reduces the magnitude of the problem.

As a result, the drums of prior art wobble centrifuges of the aforedescribed type remain susceptible to blockage.

Such blockage, naturally, reduces the separation efficiency and the degree of liquid removal so that the liquid content of the collected solid phase may increase with time until it is no longer tolerable. When blockage is acute, the apparatus must be brought to standstill, frequently interrupting a processing line at considerable cost and interruption in processing until the drum is cleared by hand.

OBJECTS OF THE INVENTION

It is the principal object of the present invention to provide an improved wobble centrifuge of the aforementioned type which is free from the blockage problem and hence which can be operated for significantly longer periods without any reduction in the separating effect or efficiency.

It is another object of this invention to provide a centrifuge drum of the grate-type, especially for a wobble centrifuge, which will be less readily blocked by solid particles and even hard, sharp-edged or elastic ball-shaped particles.

Still another object of the invention is to provide a wobble centrifuge of relatively low cost and simple construction, but obviating the disadvantages of earlier wobble centrifuges as enumerated above.

SUMMARY OF THE INVENTION

These objects and others which will become apparent hereinafter are attained, in accordance with the present invention, in a grate-type drum in a wobble centrifuge having the inner drum wall formed by an array of spaced-apart rods extending along generatrices of the drum and defining gaps between them, the array of rods being supported by a ring-and-bar structure as described, wherein means is provided to impart to the rods a periodic relative longitudinal displacement. The longitudinal displacement of the rods relative to the neighboring rods shifts the edges of the gaps, albeit slightly, to dislodge any solids which might tend to wedge in the particular gap.

According to the invention and in a preferred embodiment thereof, the support structure is torsionally elastic with reference to the axis of rotation of the drum and, in a direction perpendicular to the rotation axis and corresponding to the wobble movement, is elastically bendable.

Deformability of the grate or basket structure forming the drum and hence the relative movement of the rods associated therewith are generated by the forces, moments and oscillations affecting the sieve basket forming the drum.

In other words, in the system of the present invention, the support structure surrounding the rods, which can be anchored exclusively to the upper and lower flanges, is deformable circumferentially and axially, thereby permitting the drum to distort under the gyratory moments which are imparted thereto and inducing the relative longitudinal displacement of the rods to dislodge any particles which may tend to be gripped between them.

Advantageously, the bars of the support structure, which lie along generatrices of the drum, are flat, plate-like members anchored to the driven flange and not connected to the opposite flange. These bars of rectangular cross section have a significantly greater radial height than thickness, i.e. the ratio of the radial height to thickness is several times greater than 2 (i.e. at least 4). This has been found to ensure a significant circumferential elasticity of the support structure so that the applied forces, moments and oscillations will bring about the relative movements of the rods. The support structure of the centrifuge basket, while permitting the relative movement by reason of its elastic distortability, nevertheless is able to hold the rods against breakage by the centrifuge forces even when the rods may weaken because of wear.

The use of rods, bars and the like in filter baskets or centrifuge drums is described, for example, in one or more of the following publications, and in substantially all cases, the emphasis is upon preventing any relative movement of the rods: German patent document DE-OS No. 27 30 822 (Offenlegungsschriftopen application), German Utility Model DE-GM No. 17 94 185, Swiss Pat. No. 189,460, British Pat. No. 826,158 and U.S. Pat. No. 1,343,292.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
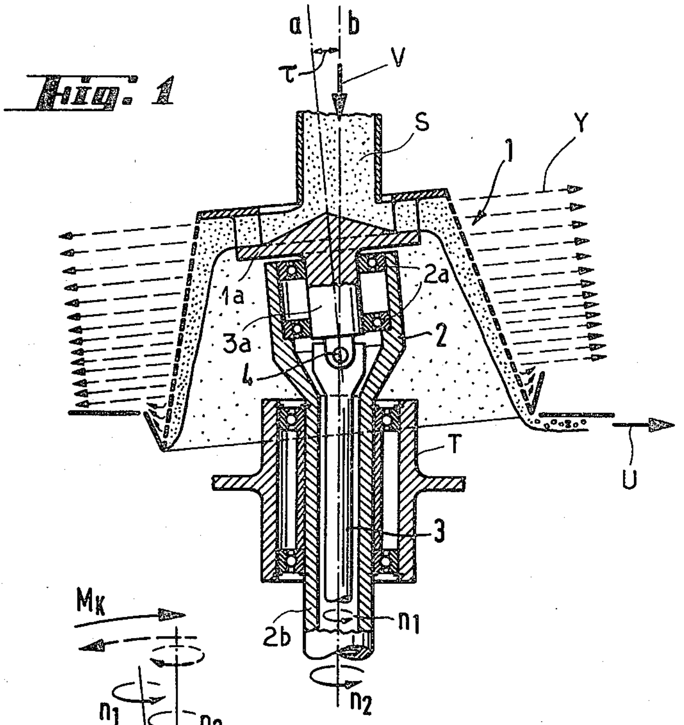
FIG. 1 is a diagrammatic cross-sectional view of the essential portions of a wobble centrifuge, the remainder of which can be of a conventional design as described, for example, in U.S. Pat. No. 4,153,551.
Figure 2:
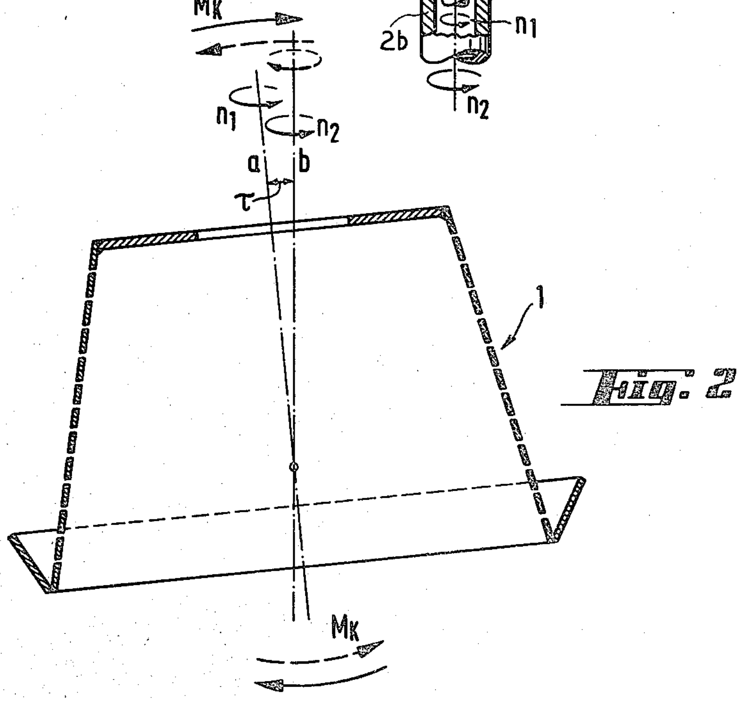
FIG. 2 is a diagram illustrating the motions and forces involved in the operation and the development of the gyratory moment which functions as a circulating bending moment for the drum.

From FIGS. 1 and 2 it can be seen that a wobble centrifuge comprises a conical drum or basket 1 which is rotatable about its axis a by a shaft stub journaled in a wobble head 2 so that the axis a forms an angle $\tau$ with the vertical gyratory axis b.

A central shaft 3 is coupled to the upper flange of the drum 1 via a stub shaft 3*a* received in the bearings 2*a* of the head 2 via a distributor 1*a* which spreads the slurry S along the inner wall of the drum as shown. A universal joint 4 connects the shafts 3 and 3*a* and is rotated at the speed $n_1$ of the inner shaft. The latter rotary speed has the wobble or precession moment superimposed thereon as generated by rotation of the head 2 via the shaft 2*b* coaxial with shaft 3 and rotating at the angular velocity $n_2$.

The shaft 2*b* is journaled in the housing T of the centrifuge, only a portion of which has been shown.

The drum thus rotates relative to the wobble head 2 with the differential speed $\Delta n = n_1 - n_2$ so that the generatrices of the drum 1 periodically have a greater and lesser inclination and a transport pulse (force) is periodically imparted to the solids slinging them from the drum as represented by the arrow U. The slurry is fed in the direction of arrow V and the liquid phase is discharged as represented by the arrows Y.

As can be seen from FIG. 2, the drum 1 is subjected to a so-called gyratory moment $M_k$ which stresses the drum with a bending moment.

Since the drum 1 rotates about the axis a with the differential speed $\Delta n$, the effective direction or vector of the gyratory moment $M_k$ sweeps around the drum and thus imparts a high alternating stress tending to bend the drum. FIG. 2 also shows the effect of the gyratory moment $M_k$ as a function of the direction of rotation about the drum axis a. With the rotation in the broken line sense, the $M_k$ vector is effective in the direction represented by the broken line arrows.

In addition to the bending stress produced by the rotation of the drum relative to the gyration moment vector or the rotation of this vector relative to the drum, additional forces are applied to the drum 1, e.g. a torsional moment and imbalance force which facilitates bending.

It should be understood that in conventional drums, perforated plates, struts, diagonal ribs and various other stiffening devices are used to prevent any elastic deformation of the drum. Relative movement of the rods of the drum will thus be precluded.

Figure 3:
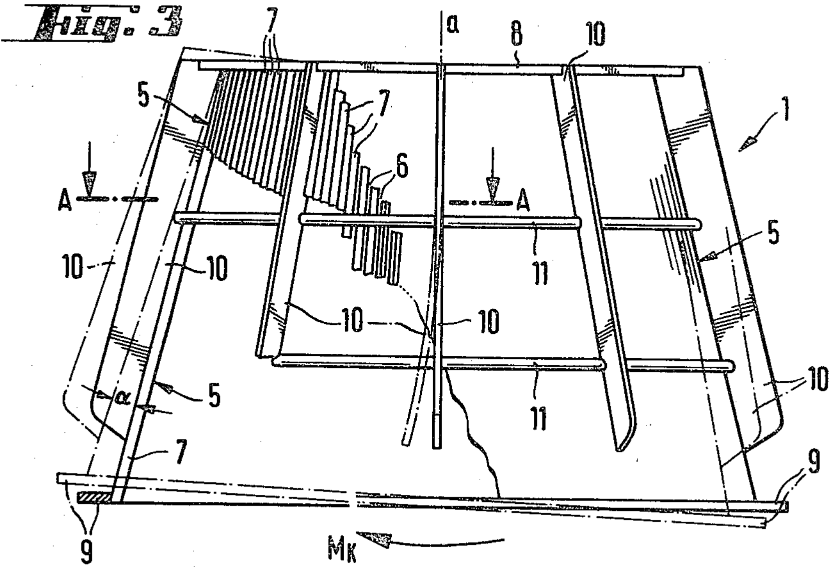
FIG. 3 is an elevational view, partly broken away, of a centrifuge drum in accordance with the present invention.
Figure 5:
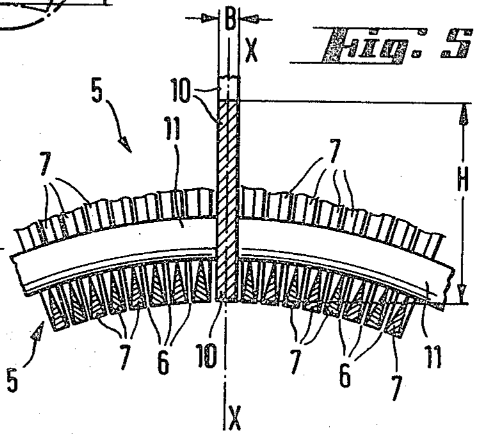
FIG. 5 is an enlarged detail view of the portion V of FIG. 4.

By contrast, with the system of the present invention, the drum is constructed as shown in FIG. 3 to have a sieve or grate shell 5 made up of the rods 7 which extend along generatrices and are of generally triangular cross section to define outwardly widening gaps 6 between them (see FIG. 5).

The upper and lower ends are affixed to the drive flange 8 and an annular lower flange 9.

The grate-like shell 5 of the drum is surrounded by a support structure which comprises angularly equispaced support bars 10, also lying along generatrices of the drum and affixed only to the drive flange 8. The lower ends of the bars 10 terminate short of or reach to the lower flange 9 although they are not affixed thereto. Axially spaced support rings 11 pass through and are secured to the bars 10 to take up centrifugal forces.

Figure 4:
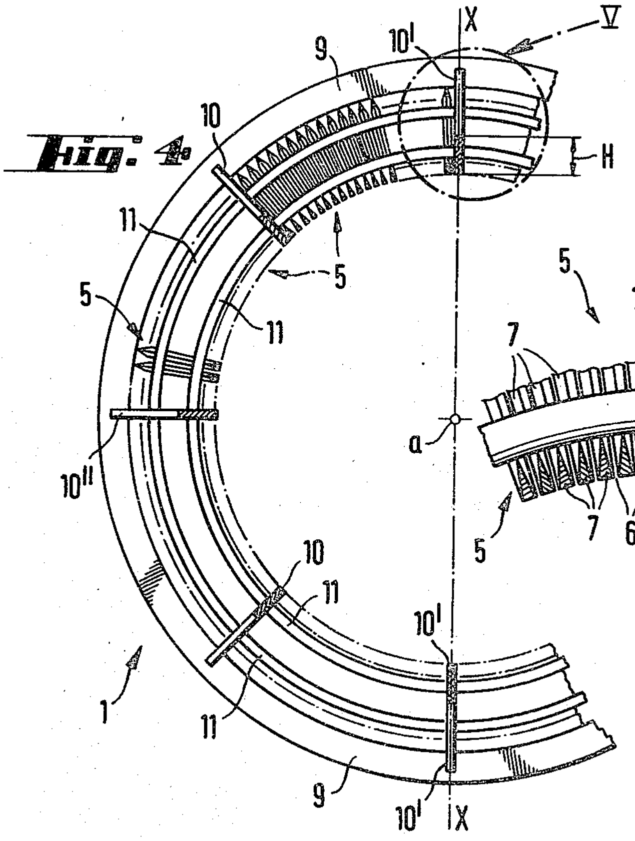
FIG. 4 is a section taken along the line A—A of FIG. 3.

As can be seen from FIGS. 4 and 5, the bars 10 are flat and have a rectangular cross section such that the radial height of the cross section (as represented at H) is large by comparison with the thickness B. The height H which can be measured perpendicular to the cone surface, defines a ratio H/B to the thickness which is significantly greater than those used in prior art support structures in which this ratio is at most 2. For a constant bar cross section, the thickness is reduced in proportion to the increase in the height and an optimum ratio is 8:1 to 10:1.

It has been found that a reduction in the bar thickness of ¼ to 1/5 of the thickness of prior art support bars, together with a corresponding but inverse increase in the height, reduces the stiffness of the bar about the bending axis X—X to about 1/100th of the prior art value. In other words, the bar is a hundred times more bendable.

Thus, when the centrifuge is operated, the drum elastically deforms by the dot-dash lines in FIG. 3 with elastic axis X—X in an elastic manner and without residual stress in these bars. The outer bars 10″ shift or twist (angle $\alpha$ in FIG. 3) and an elastic deformation occurs in the flanges 8 and 9 as well to bring about relative movements of the rods 7. The bending moment $M_k$ is taken up substantially by the outermost bars 10″ and transformed into tension and compression stresses. Since the gyratory moment $M_k$ rotates about the drum, the relative movement of the rods sweeps around the periphery. The drum can also twist as a result of the torsion moment, thereby augmenting the relative movements of the rods. Such torsion moments are generated by the acceleration of the product along the drum as the peripheral speed increases from smaller to larger diameter portion thereof. Nevertheless, the bending contributed by the gyratory moment $M_k$ predominates as the cause of the relative movement of the rods.

I claim:

1. A wobble centrifuge comprising:

a frustoconical drum having a sieve surface made up of individual spaced-apart rods defining slot-like gaps between them and surrounding a drum axis, said rods being affixed to flanges at opposite axial end of the drum and being adapted to receive a suspension of solids in a liquid whereby liquid is centrifugally discharged through said slots and said solids pass off a large diameter end of said drum;

means connected to said drum for rotating said drum about said drum axis and for orbiting said drum axis about another axis whereby said drum undergoes a wobble movement to impart a discharge pulse to solids passing from said drum; and means for imparting relative movement to said rods of said drum whereby the relative movement of said rods dislodges solids tending to collect in said gaps, said means for imparting relative movement to said rods including a support structure surrounding said rods and connected to said drum capable of undergoing elastic deformation, wobbling of said drum applying a gyratory moment to said dstructure inducing deformation of said drum and the relative movement of said rods, said support structure comprising a plurality of angularly equispaced bars extending along generatrices of said drum and affixed to one of said flanges but unconnected to the other flange, and a plurality of axially spaced rings surrounding said rods and secured to said bars.

2. The centrifuge defined in claim 1 wherein said bars are formed as flat plates of rectangular cross section having a height transverse to the drum surface which is at least several times greater than the thickness of the bar.

3. The centrifuge defined in claim 2 wherein the ratio of the height to the thickness of the bar is at least 4.

4. The centrifuge defined in claim 3 wherein said ratio is between substantially 8 and 10.

5. The centrifuge defined in claim 4 wherein each bar has a triangular cross section and said gaps widen in cross section outwardly.

* * * * *